US011007805B1

(12) United States Patent
Mercier

(10) Patent No.: US 11,007,805 B1
(45) Date of Patent: May 18, 2021

(54) SECURITY DOCUMENTS WITH TEXT SECURITY FEATURE

(71) Applicant: ASSA ABLOY AB, Stockholm (SE)

(72) Inventor: Frantz Mercier, Hollister, CA (US)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 16/804,661

(22) Filed: Feb. 28, 2020

(51) Int. Cl.
*B41M 3/14* (2006.01)
*B42D 25/00* (2014.01)
*G06F 40/109* (2020.01)
*H04N 1/32* (2006.01)

(52) U.S. Cl.
CPC .............. *B41M 3/14* (2013.01); *B42D 25/00* (2014.10); *G06F 40/109* (2020.01); *H04N 1/32288* (2013.01); *H04N 2201/3271* (2013.01); *H04N 2201/3281* (2013.01)

(58) Field of Classification Search
CPC ................................. B41M 3/14; B42D 25/00
USPC .......................................................... 283/17
See application file for complete search history.

(56) References Cited

U.S. PATENT DOCUMENTS

| 7,878,549 B2 * | 2/2011 | Simske | B41M 3/14 |
| | | | 283/17 |
| 8,220,835 B2 * | 7/2012 | Green | B42D 25/20 |
| | | | 283/17 |
| 8,982,424 B2 * | 3/2015 | Weaver | B42D 25/00 |
| | | | 358/3.28 |

FOREIGN PATENT DOCUMENTS

WO   WO-2013160880 A2 * 10/2013 ............. B42D 25/29

OTHER PUBLICATIONS

WO-2013160880-A2 English Translation (Year: 2013).*

* cited by examiner

*Primary Examiner* — Kyle R Grabowski
(74) *Attorney, Agent, or Firm* — Schwegman Lundberg & Woessner, P.A.

(57) ABSTRACT

Printing, engraving, etching, or embossing techniques and security documents produced therefrom that can help inhibit or prevent tampering or forgery, particularly forgery or tampering of security document blanks or blank security documents. For example, for at least one character of a given alphabet used for the text in the security document, the character may include one or more slight variations or differences between instances of such character based on, for example, human selection, a predefined pattern, an automated selection algorithm or formula, or random or semi-random selection. In order to duplicate the security document blank, a forger would need to painstakingly review and copy each individual character including the slight variation or difference provided with that instance of the character.

13 Claims, 7 Drawing Sheets

SECURITY DOCUMENTS WITH TEXT SECURITY FEATURE

TECHNICAL FIELD

This document pertains generally, but not by way of limitation, to printing techniques for producing security documents and other articles of manufacture.

BACKGROUND

Security printing is the field of the printing industry that deals with the printing of security documents such as banknotes, currency, checks, passports, driver's licenses, identification (ID) cards, credit cards, birth certificates, tamper-evident labels, pharmaceutical packaging or other product authentication, stock certificates, bonds, postage stamps, event tickets, sporting cards (e.g., baseball cards), playing cards (e.g., such as for gambling), and wills or other legal documents, among other examples.

A goal of security printing is to prevent forgery, tampering, or counterfeiting. For example, Mercier U.S. patent application Ser. No. 15/899,062 is directed toward a security document with text printing security feature and method for producing the same. Security printing can be done on commercial printers like traditional offset and flexographic presses, as well as using newer digital platforms.

SUMMARY

The present disclosure recognizes, among other things, that a challenge faced in printing security documents is how to inhibit or prevent forgery or tampering, particularly forgery or tampering of security document blanks or blank security documents. The present subject matter includes printing techniques and resulting security documents that can help inhibit or prevent such tampering or forgery by, for example, for at least one character of a given alphabet used for the text in the security document, defining or including one or more slight variations or differences between instances of such character based on, for example, human selection, a predefined pattern, an automated selection algorithm or formula, or random or semi-random selection.

BRIEF DESCRIPTION OF THE DRAWINGS

In the drawings, like numerals may describe similar components in different views. Like numerals having different letter suffixes may represent different instances of similar components. The drawings illustrate generally, but not by way of limitation, various embodiments discussed in the present document.

DETAILED DESCRIPTION

The present subject matter includes printing, engraving, etching, or embossing techniques and security documents produced therefrom that can help inhibit or prevent tampering or forgery, particularly forgery or tampering of security document blanks or blank security documents. As generally used herein, and among other ordinary and customary understandings of the term security document blank, the terms "security document blank" or "blank security document," which may also be referred to as a "document blank" or simply a "blank," are intended to include a document that includes one or more static images, static text information, and/or other static data that is generic or common to a group or plurality of security documents and generally does not include any personal identifying information specific to a particular individual. Such security document blank is ready for personalization, that is ready to be printed with additional one or more images, text information, and/or other data that includes but is not limited to one or more images, text information, and/or other data that is specific to or personalized to a particular individual, such as the would-be holder or owner of the resulting personalized security document.

Often, custom fonts are developed and utilized for printing text information to the security document blanks, which generally increases the difficulty to forge the security document blank. However, once a forger copies and can reproduce the custom font, the forger has the alphabet template needed to copy any text information of the original security document blank and forge copies thereof.

The present subject matter can help inhibit or prevent tampering or forgery, particularly forgery or tampering of security document blanks by, for example, for at least one character of a given alphabet used for the text in the security document, defining or including one or more slight variations or differences between instances of such character based on, for example, human selection, a predefined pattern, an automated selection algorithm or formula, or random or semi-random selection. Accordingly, in order to duplicate the security document blank, a forger would need to painstakingly review and copy each individual character including the slight variation or difference provided with that instance of the character.

Figure 1:
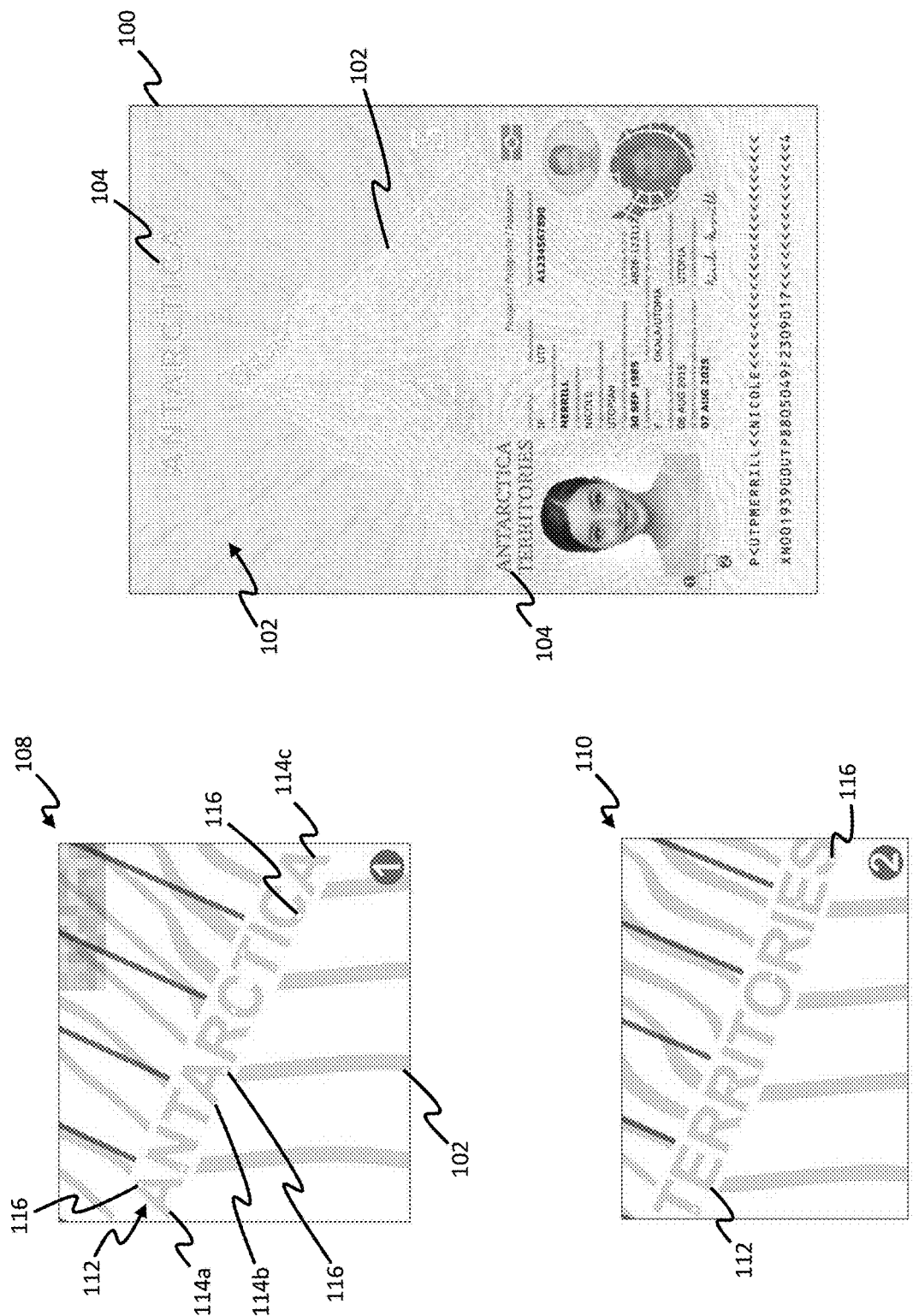
FIG. 1 is an illustrative example of a security document produced with variations in characters printed thereon to inhibit or prevent tampering or forgery.

FIG. 1 illustrates a nonlimiting example of a security document, in this case in the form of a personalized passport for a particular territory. The security document includes a security document blank 100 having one or more static images or designs 102 and static text information 104 that is generic or common among passports for this territory. In the illustrative example of FIG. 1, the security document blank 100 has been further printed with personalization information 106 that is specific to or personalized to a particular individual, transforming or converting the security document blank into a printed or issuable security document. While a passport is illustrated in FIG. 1, additional examples of security documents include but are not limited to banknotes, currency, checks, driver's licenses, identification (ID) cards, credit cards, birth certificates, tamper-evident labels, pharmaceutical packaging or other product authentication, stock certificates, bonds, postage stamps, event tickets, sporting cards (e.g., baseball cards), playing cards (e.g., such as for gambling), and wills or other legal documents. However, the subject matter of the present disclosure is not limited to printing security documents and may also be applied to other conventional document types. The security document or other document can be formed on a paper page or other substrate, such as but not limited to polycarbonate, polyvinyl chloride (PVC), cardboard, plastic wrap, metal, glass, or the like.

As illustrated more clearly in the magnified views 108 and 110 of corresponding boxes labeled "1" and "2" identified in the security document, the security document blank 100 can include microtext 112 in the form of one or more recognizable characters provided at a scale that is relatively difficult to read with the naked eye, and in some cases, may require magnification to read clearly or to discern significant or substantive aspects and features of the character.

As illustrated in magnified views 108 and 110, different instances 114a, 114b, and 114c of similar characters (e.g., the letter "A" in magnified view 108) within the alphabet used for the microtext 112 may individually include or not include a modification, alteration, or variation 116 (which may be referred to herein simply as "variation") to the character. That is in some cases, such as with the example instance of the letter "A" 114c, the character may be considered unmodified or unaltered from an original format of the character. In other cases, such as with the example instances of the letter "A" 114a and 114b including a variation 116, the character may be modified or altered from the original format in some way, shape, or form. As illustrated in magnified views 108 and 110, the variation 116 exhibited by a given character may be a dot of contrasting color positioned somewhere within the character. As also illustrated in magnified view 108, with respect to instances of the letter "A" 114a and 114b, the position of the variation 116 within the character may also, but need not, vary between one or more instances of the character.

The variation 116 included in any given instance of a character is not limited to the example dot of contrasting color illustrated in FIG. 1. Rather, the modification, alteration, or variation 116 may generally take any form, shape, and/or color positioned and/or oriented anywhere within or overlapping, or at least partially within or overlapping, the character or character space. Nonlimiting examples of a variation 116 include: one or more dots, triangles, squares, rectangles, polygons, and/or irregular shapes provided in one or more locations at least partially within or overlapping the character or character space; one or more spacings, slits, notches, and/or subtractive features formed at least partially within or overlapping the character or character space; a pattern, such as a striped or plaid pattern, formed into the character; a variation in color or thickness in one or more areas at least partially within or overlapping the character or character space; one or more changes or variations in the anatomy of the character, such as a change or variation to one or more of an ascender, descender, arm, eye, bowl, crossbar, height, shoulder, tail, terminal, spur, counter, serif, etc. of the character; and any combinations of the foregoing.

Figure 2A:
FIGS. 2A and 2B illustrate example font sets.
Figure 2B:
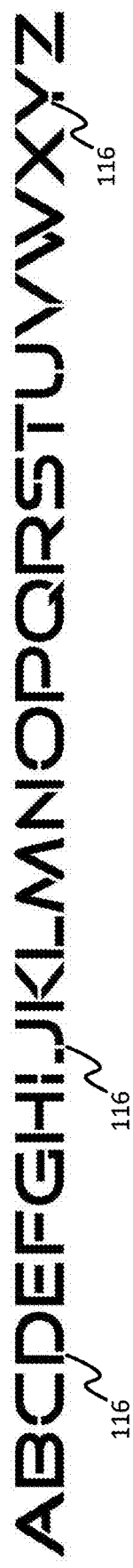

FIGS. 2A and 2B illustrate an example of a font alphabet having another type of variation 116 that is different than the dot illustrated in FIG. 1. FIG. 2A illustrates a first font set 200 having a first version of each character in the example alphabet wherein the font may be considered unmodified or unaltered from an original format. FIG. 2B illustrates a second font set 202 having a second version of each character in the example alphabet including some modification, alteration, or variation 116 as compared to the same character in the first font set 200. In the example illustrated in FIG. 2B, the variation 116 comprises a space or slit positioned and oriented within the character. The positioning and orientation of the variation 116 from character to character could but does not need to be consistent, as is demonstrated in FIG. 2B.

With respect to any particular character, e.g., 114a, 114b, 114c, used in text, such as microtext 112, of the security document blank 100, whether a variation 116 is included and/or which variation is included in any given instance of that character may be based on any suitable selection mechanism. In some cases, whether a variation 116 is included and/or which variation is included in any given instance of a given character, e.g., 114a, 114b, 114c, may be determined by human selection, which may done, for example, randomly, semi- or quasi-randomly, pursuant to a repeating or non-repeating pattern, and/or pursuant to an algorithm or formula. In some cases, whether a variation 116 is included and/or which variation is included in any given instance of a given character, e.g., 114a, 114b, 114c, may be determined automatically by, for example, a computer or other processing device, described in further detail herein, and may be done pursuant to a random, pseudo-random, or quasi-random algorithm, a repeating or non-repeating pattern, and/or any other suitable algorithm or formula. In general, any suitable mechanism for determining whether a variation 116 is included and/or which variation is included in any given instance of a given character may be used. Likewise, any combination of the mechanisms may be used to determine whether a variation 116 is included and/or which variation is included in any given instance of a given character.

Figure 3:
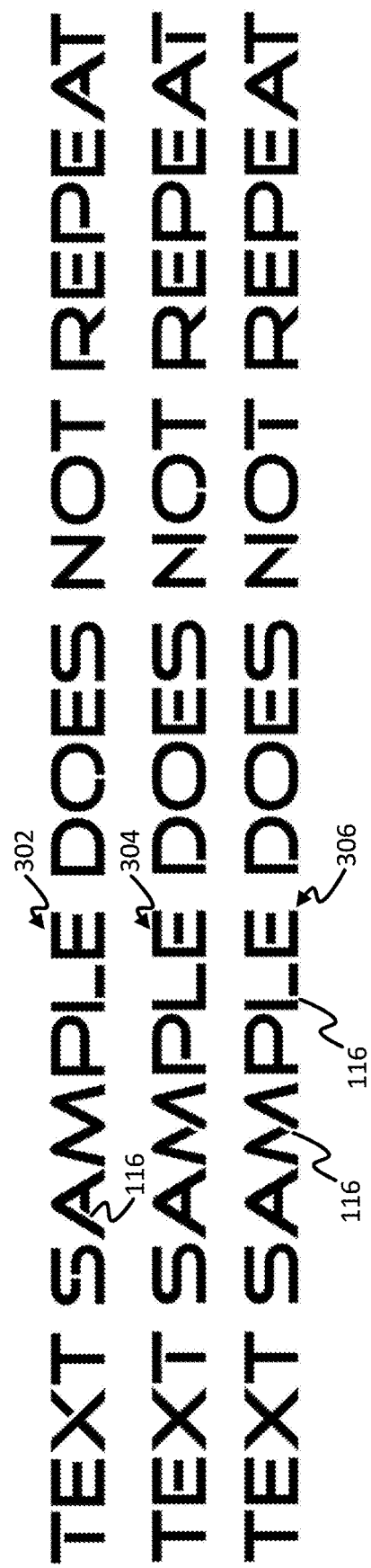
FIG. 3 illustrates an example where the combination of variations in the characters making up a repeating word vary between instances of that word.

In an example, regardless the mechanism utilized to determine whether a variation 116 is included and/or which variation is included in any given instance of a given character, variations may be included in text or microtext, e.g., 112, of the security document blank 100 such that for words that repeat within the text, the combination of variations in the characters making up that word vary from instance to instance of that word, or at least vary from one instance of that word to at least one other instance of that word. FIG. 3 illustrates an example where the combination of variations 116 in the characters making up a repeating word, e.g., the word "SAMPLE," vary between instances of that word. Specifically, in the nonlimiting example of FIG. 3, in a first instance of the word "SAMPLE" 302, the characters "S," "A," and "L" comprise a variation 116, while in a second instance of the word "SAMPLE" 304, the characters "M," "P," and "E" comprise a variation and in a third instance of the word "SAMPLE" 306, the characters "M," "L," and "E" comprise a variation 116. The combinations of variations in the characters making up the other words in the example, e.g., "TEXT," "DOES," "NOT," and "REPEAT," similarly vary from instance to instance of those words.

Figure 4:
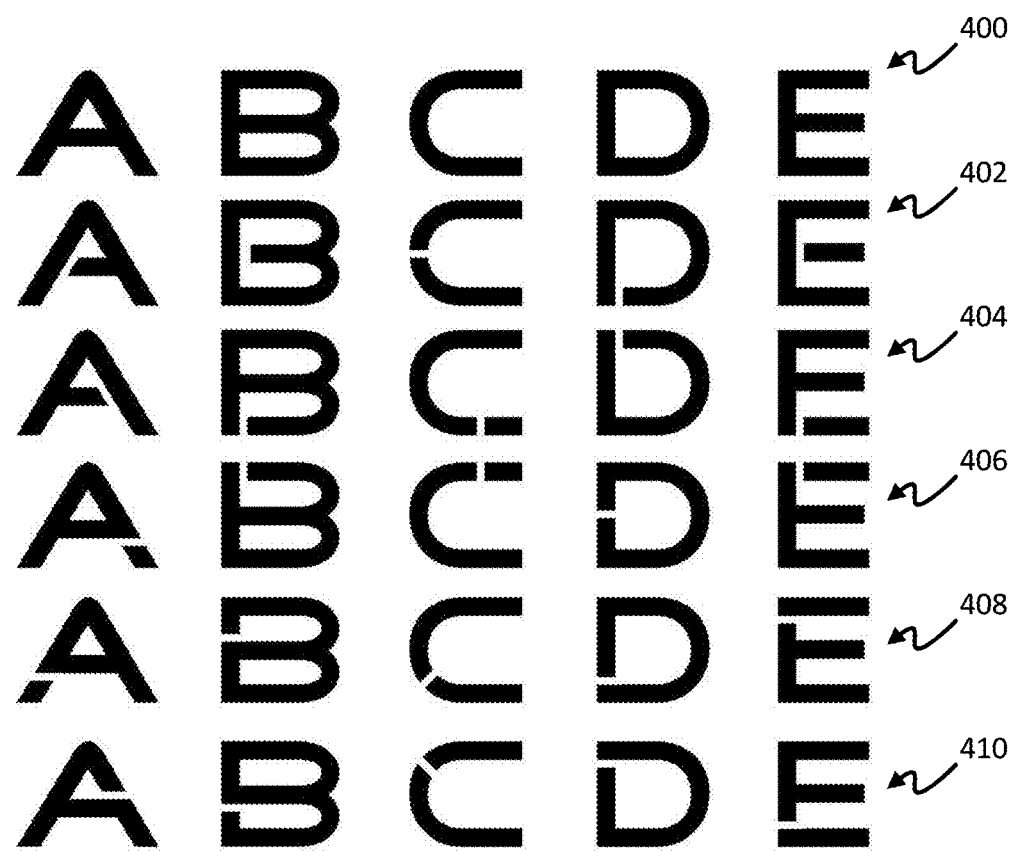
FIGS. 4 and 5 illustrate additional example font sets.
Figure 5:
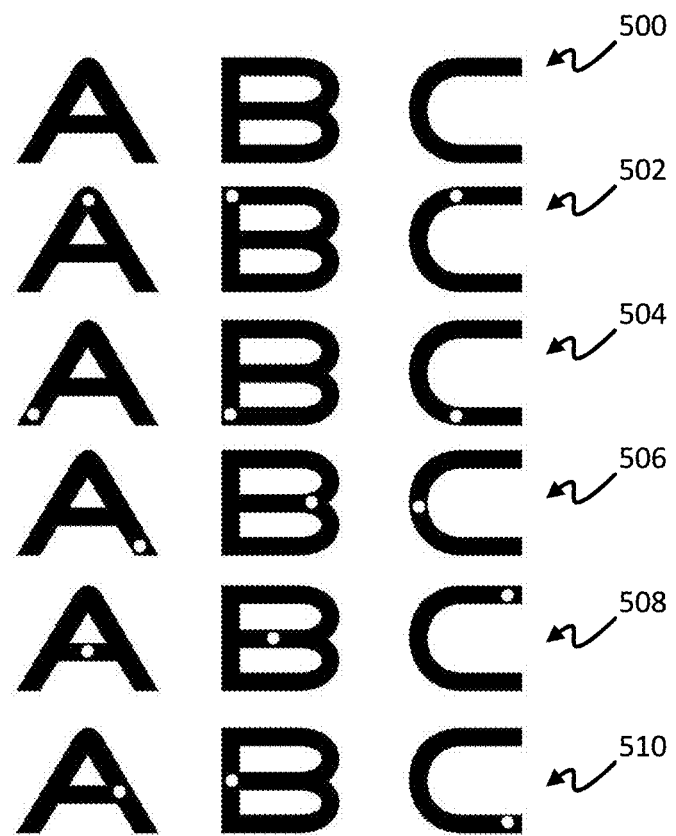

The number of font sets for a given alphabet is not limited to two as provided for example in FIGS. 2A and 2B. Rather, any suitable number of font sets may be used. FIG. 4 illustrates an example having a group of six font sets 400, 402, 404, 406, 408, and 410 of a sample five-character alphabet. Font set 400 may be considered an original font and each font set 402, 404, 406, 408, and 410 may include variations 116 for each character, where for a given character, the variation 116 is different between each font set. In the example shown, the variation 116 provided for each character in font sets 402, 404, 406, 408, and 410 is a space or slit positioned at different locations and/or oriented at different angles from instance to instance of such character across the font sets. FIG. 5 illustrates yet another example with a group of six font sets 500, 502, 504, 506, 508, and 510 of a sample three-character alphabet. Font set 500 may be considered an original font and each font set 502, 504, 506, 508, and 510 may include variations 116 for each character, where for a given character, the variation 116 is different between each font set. In the example shown, the variation 116 provided for each character in font sets 502, 504, 506, 508, and 510 is a dot of contrasting color positioned at different locations from instance to instance of such character across the font sets.

As noted above, the variation 116 is not limited to dots or slits but may generally take any form, shape, and/or color positioned and/or oriented anywhere within or overlapping, or at least partially within or overlapping, the character or character space. Likewise, a group of font sets, e.g., 400, 402, 404, 406, 408, and 410, is not limited to using a single form, shape, or color of variation 116, such as a dot or slit, across all font sets of the group, and any font set of the group may include one or more variations of form, shape, and/or color that is different from a variation or variations used in one or more of the other font sets in the group. For example, a font set group for a given alphabet could comprise font set 400, one or more font sets selected from font sets 402, 404, 406, 408, and 410, and one or more font sets selected from font sets 502, 504, 506, 508, and 510. Additionally, it is not required that every font set, e.g., font sets 400, 402, 404, 406, 408, 410, include every character from a given alphabet or that every character of a given font set, e.g., 400, 402, 404, 406, 408, 410, has to include some variation 116.

The variation type, form, shape, color, position, orientation, etc. does not need to be consistent across characters in an alphabet or font set. Additionally, the variation is not limited to a single modification or alteration in a single location of a given character but more generally could comprise one or more modifications or alterations of one or more types to one or more locations in the character. Also, it is not required that every character of a given alphabet has two or more versions, such as both an unmodified or unaltered version and one or more modified or altered versions including at least one variation 116. It is sufficient in some cases that less than all characters, or even just a single character, of a given alphabet have both an unmodified or unaltered version and one or more modified or altered versions including at least one variation 116 or that at least one character of a given alphabet has at least two modified or altered versions, for example where the original version will not be used.

The variation 116 may be selected such that while discernible to the naked eye of an average viewer/reader, the likelihood that the variation from instance to instance of a character will generally go unnoticeable or be less noticeable to a casual observer is relatively high and, thus, the difficulty a forger would have in recognizing the existence of such variation or detect that the variation may change from instance to instance of the same character is increased. In some cases, the variation 116 may not generally be discernible to the naked eye of an average viewer/reader and may require magnification to discern the variation.

Figure 6:
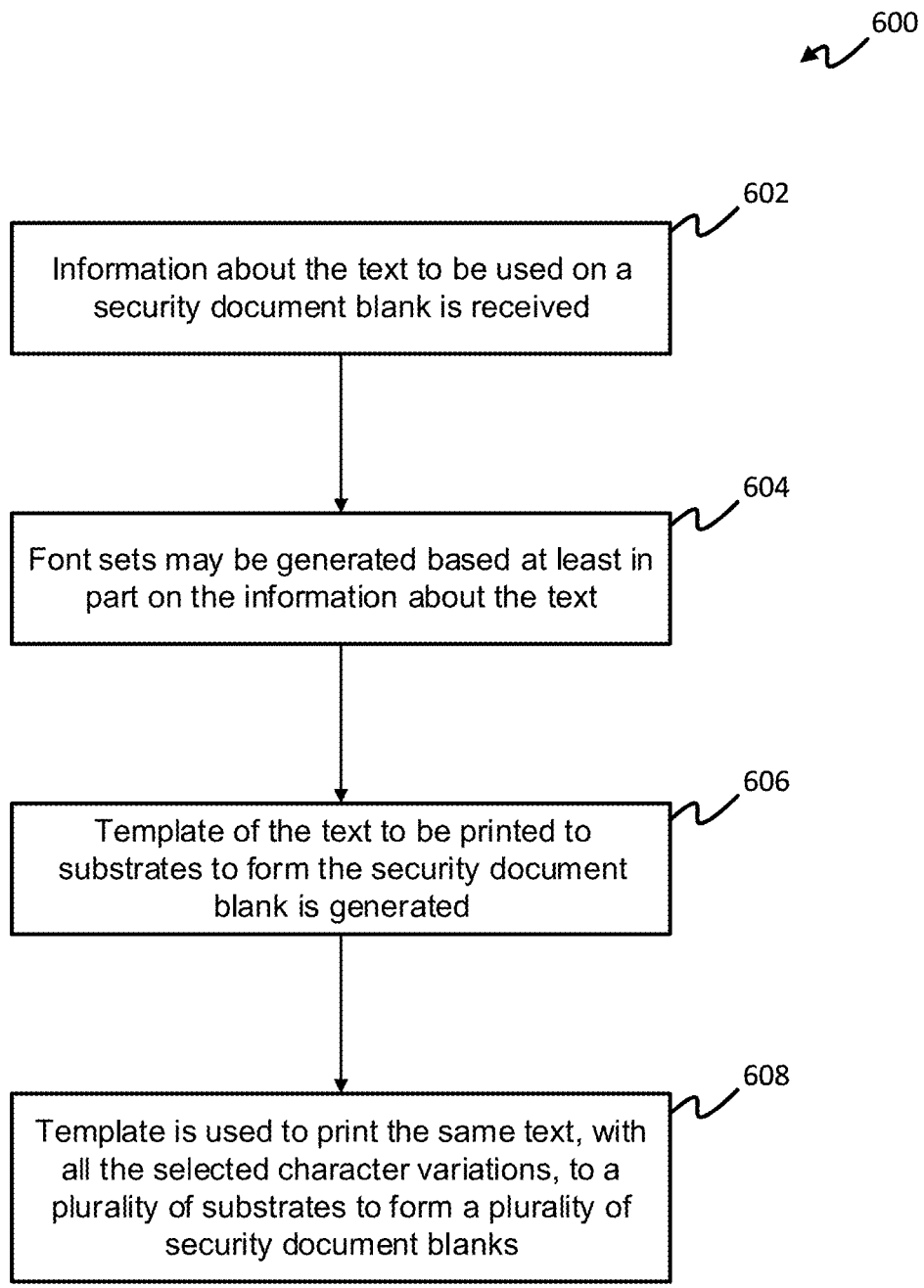
FIG. 6 illustrates an example method of printing, engraving, etching, embossing, or otherwise modifying a substrate of a security document or other article of manufacture using one or more of the techniques of the present disclosure.

FIG. 6 illustrates an example of a method 600 of printing, engraving, etching, embossing, or otherwise modifying a substrate of a security document or other article of manufacture, such as using one or more of the present techniques. At 602, information about the text, such as that formed using alphanumeric or other characters, to be used on a security document blank 100 can be received. Information about the text may also include information about the font, such as a custom font, to be used for the text. At step 604, two or more font sets may be generated based at least in part on the information about the text. A first font set may include the original font defined in the information about the text, and one or more additional font sets may each include one or more characters having a variation 116 as described herein. In some cases, the original font defined in the information may not be used as one of the two or more font sets, and the two or more font sets may include only font sets that each include one or more characters having a variation 116 as described herein. The font sets may be manually generated by a human, automatically generated by a computer or other processing device, described in further detail herein, or generated by a combination thereof. In any event, any one or more of the form, shape, color, position, and/or orientation, etc. of any one or more of the variations 116 may be predetermined or may be determined dynamically based on, for example, a random, semi-random, or quasi-random algorithm, pursuant to a repeating or non-repeating pattern, and/or pursuant to some other suitable algorithm or formula.

At step 606, a template of the text to be printed to substrates to form the security document blank 100 may be generated using characters from the font sets generated at step 604. As indicated above, from which font set any given character is selected for the text of the template, or more generally, whether a variation 116 is included and/or which variation is included in any given instance of a character in the text of the template, may be based on any suitable selection mechanism. For example, the selection of any given character for the text of the template may be made by manual human selection, which may done, for example, randomly, semi- or quasi-randomly, pursuant to a repeating or non-repeating pattern, and/or pursuant to an algorithm or formula. Additionally or alternatively, the selection of any given character for the text of the template may be done automatically by, for example, a computer or other processing device, described in further detail herein, and may be done pursuant to a random, pseudo-random, or quasi-random algorithm, a repeating or non-repeating pattern, and/or any other suitable algorithm or formula. The template may be prepared and/or provided in an electronic, computer-readable format, such as using any text or image processing software.

In some cases, the step of generating font sets (i.e., step 604) may be eliminated, and the template of the text may be generated without using font sets, and variations 116 can be included within the template, for example, "on-the-fly" at or around the time of generation of the template or otherwise dynamically included within the template at or around the time of generation thereof. Whether a variation is dynamically included within any given character of the template as well as the type, style, shape, position, orientation, etc. of any variation may similarly be based on any suitable selection mechanism, as previously described.

At step 608, the template may be used to print the same static text, including all the selected character variations 116, to a plurality of substrates to form a plurality of security document blanks 100. In some cases, the template may be provided in an electronic, computer-readable format that can be input to or received at a computer-implemented or other printer controller or driver circuit, such as a digital printer, and the printer or like device may process, e.g., using raster image processing or vector image processing, and use the template for printing at least a portion of the information for the security document blank to the substrates. In some cases, the template may be "ripped" (i.e., processed via raster image processing) and plates may be prepared, e.g., using the ripped template with a computer to plate (CTP) system, for use with an offset printing press to print at least a portion of the information for the security document blank to the substrates. In general, any printing, engraving, etching, or embossing process, technique, or the like, or any combination thereof may be used to print the information for the security document blank to the substrates, and the present subject matter is not limited to using only digital printing or offset printing techniques.

As mentioned above, in order to duplicate a security document blank 100 produced pursuant to the techniques and methodologies of the present disclosure, a forger would need to painstakingly review and copy each individual character including the slight variation or difference provided with each instance of a character. A forgery can be determined by comparing the suspected forgery to the known template or a security document blank (or copy or reproduction thereof) produced from the known template.

While primarily discussed herein with respect to microtext, the present subject matter may be applied to any text of the security document. Similarly, while primarily discussed herein with respect to static information provided on security document blanks, the present subject matter may be applied to any type of information, including personalization information that is specific to or personalized to a particular individual and is printed to a security document blank. Further yet, while primarily discussed herein with respect to security documents and security document blanks, the present subject matter may be applied to any type of document and is not limited to security documents. Also, while the examples have used an English alphabet (e.g., with 26 characters) to provide alphanumeric characters, the present subject matter can be used with characters or numbers of other alphabets of other languages or numbering systems, or with a language that defines entire words (e.g., pictorially) rather than defining individual characters within a word.

Figure 7:
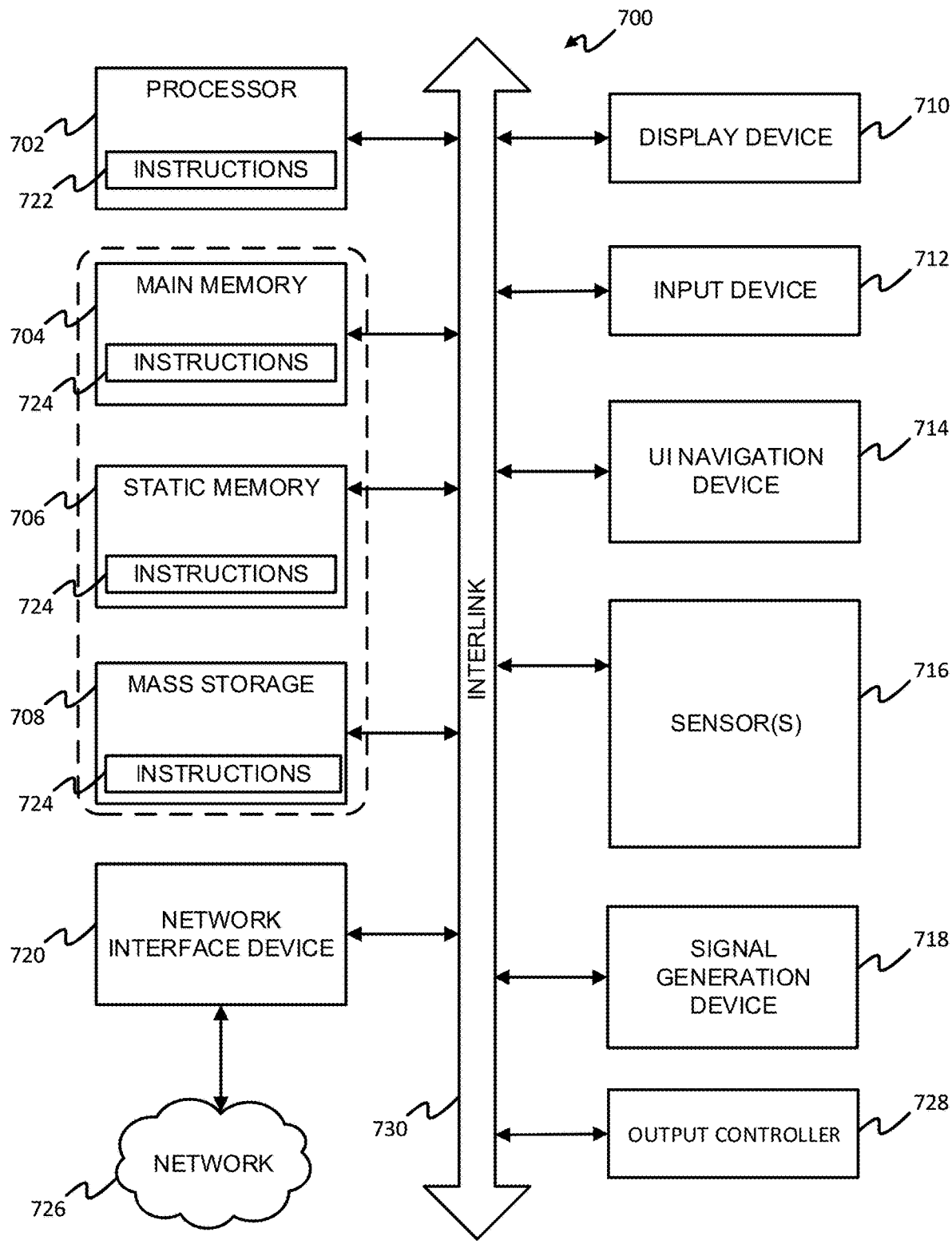
FIG. 7 illustrates a block diagram schematic of various example components of an example machine upon which any one or more of the techniques or methodologies discussed herein may perform.

FIG. 7 illustrates a block diagram schematic of various example components of an example machine 700 upon which any one or more of the techniques or methodologies discussed herein may perform. Examples, as described herein, can include, or can operate by, logic or a number of components, or mechanisms in machine 700. Generally, circuitry (e.g., processing circuitry) is a collection of circuits implemented in tangible entities of machine 700 that include hardware (e.g., simple circuits, gates, logic, etc.). Circuitry membership can be flexible over time. Circuitries include members that can, alone or in combination, perform specified operations when operating. In some examples, hardware of the circuitry can be immutably designed to carry out a specific operation (e.g., hardwired). In some examples, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions permit embedded hardware (e.g., the execution units or a loading mechanism) to create members of the circuitry in hardware via the variable connections to carry out portions of the specific operation when in operation. Accordingly, in some examples, the machine readable medium elements are part of the circuitry or are communicatively coupled to the other components of the circuitry when the device is operating. In some examples, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional and/or more specific examples of components with respect to machine 700 follow. Machine 700 can operate as a standalone device or can be connected (e.g., networked) to other machines. In a networked deployment, machine 700 can operate in the capacity of a server machine, a client machine, or both in server-client network environments. In some examples, machine 700 can act as a peer machine in a peer-to-peer (P2P) (or other distributed) network environment. Machine 700 can be or include a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 700 can include a hardware processor 702 (e.g., a central processing unit (CPU), a graphics processing unit (GPU), a hardware processor core, or any combination thereof) and a main memory 704, a static memory (e.g., memory or storage for firmware, microcode, a basic-input-output (BIOS), unified extensible firmware interface (UEFI), etc.) 706, and/or mass storage 708 (e.g., hard drives, tape drives, flash storage, or other block devices) some or all of which can communicate with each other via an interlink (e.g., bus) 730. Machine 700 can further include a display device 710 and an input device 712 and/or a user interface (UI) navigation device 714. Example input devices and UI navigation devices include, without limitation, one or more buttons, a keyboard, a touch-sensitive surface, a stylus, a camera, a microphone, etc.). In some examples, one or more of the display device 710, input device 712, and UI navigation device 714 can be a combined unit, such as a touch screen display. Machine 700 can additionally include a signal generation device 718 (e.g., a speaker), a network interface device 720, and one or more sensors 716, such as a global positioning system (GPS) sensor, compass, accelerometer, or other sensor. Machine 700 can include an output controller 728, such as a serial (e.g., universal serial bus (USB), parallel, or other wired or wireless (e.g., infrared (IR), NFC, etc.) connection to communicate or control one or more peripheral devices (e.g., a printer, card reader, etc.).

Processor 702 can correspond to one or more computer processing devices or resources. For instance, processor 702 can be provided as silicon, as a Field Programmable Gate Array (FPGA), an Application-Specific Integrated Circuit (ASIC), any other type of Integrated Circuit (IC) chip, a collection of IC chips, or the like. As a more specific example, processor 702 can be provided as a microprocessor, Central Processing Unit (CPU), or plurality of microprocessors or CPUs that are configured to execute instructions sets stored in an internal memory 722 and/or memory 704, 706, 708.

Any of memory 704, 706, and 708 can be used in connection with the execution of application programming or instructions by processor 702, and for the temporary or long-term storage of program instructions or instruction sets 724 and/or other data. Any of memory 704, 706, 708 can comprise a computer readable medium that can be any medium that can contain, store, communicate, or transport data, program code, or instructions 724 for use by or in connection with machine 700. The computer readable medium can be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), Dynamic RAM (DRAM), a solid-state storage device, in general, a compact disc read-only memory (CD-ROM), or other optical or magnetic storage device. Computer readable media includes, but is not to be confused with, computer readable storage media, which is intended to cover all physical, non-transitory, or similar embodiments of computer readable media.

Network interface device 720 includes hardware to facilitate communications with other devices over a communication network 726, utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, wireless data networks (e.g., IEEE 802.11 family of standards known as Wi-Fi, IEEE 802.16 family of standards known as WiMax), IEEE 802.15.4 family of standards, and peer-to-peer (P2P) networks, among others. In some examples, network interface device 720 can include an Ethernet port or other physical jack, a Wi-Fi card, a Network Interface Card (NIC), a cellular interface (e.g., antenna, filters, and associated circuitry), or the like. In some examples, network interface device 720 can include a plurality of antennas to wirelessly communicate using at least one of single-input multiple-output (SIMO), multiple-input multiple-output (MIMO), or multiple-input single-output (MISO) techniques.

As indicated above, machine 700 can include one or more interlinks or buses 730 operable to transmit communications between the various hardware components of the machine. A system bus 730 can be any of several types of commercially available bus structures or bus architectures.

To recap and further explain, a numbered list of Aspects of the present disclosure are included below.

Aspect 1 of the present disclosure can include an article of manufacture than can include a substrate. A sequence of characters can be arranged in one or more words on the substrate. A first same character can be used at least twice in the sequence of characters, and at least one instance of the first same character can include a variation as compared to at least one other instance of the first same character. The at least one instance of the first same character can be selected at least one of: randomly, semi-randomly, or based on a predetermined algorithm.

Aspect 2 can optionally include, or optionally be combined with one or more features of Aspect 1 to include, that a plurality of characters are used at least twice in the sequence of characters. At least one instance of each of the plurality of characters that are used twice can include a variation as compared to at least one other instance of that same character.

Aspect 3 can optionally include, or optionally be combined with one or more features of any previous Aspect to include, that for at least a subset of the characters in the sequence of characters arranged on the substrate, each character can be selected from one of: a first font set comprising an alphabet of characters and one or more second font sets each comprising an alphabet of characters. For each of the one or more second font sets, at least one character in its alphabet of characters can include a variation as compared to a corresponding character in the alphabet of characters of the first font set.

Aspect 4 can optionally include, or optionally be combined with one or more features of any previous Aspect to include, that selection of a given character from either the first font set or one of the one or more second font sets for inclusion in the subset is at least one of: random, semi-random, or based on a predetermined algorithm.

Aspect 5 can optionally include, or optionally be combined with one or more features of any previous Aspect to include, that the sequence of characters can be arranged into a plurality of words, and at least a first word of the plurality of words and a second word of the plurality of words are the same word. A combination of variations of characters in the first word can be different than a combination of variations of characters in the second word.

Aspect 6 can optionally include, or optionally be combined with one or more features of any previous Aspect to include, that the variation can comprise at least one of: a dot, a slit, a notch, a triangle, a square, a rectangle, a polygon, or an irregular shape, which at least partially overlaps a space of the corresponding character.

Aspect 7 can optionally include, or optionally be combined with Aspect 2, for example, to include, that the variation can comprise a subtractive feature formed in the corresponding character.

Aspect 8 can optionally include, or optionally be combined with one or more features of any previous Aspect to include, that the variations of at least two instances of characters that include a variation are different in at least shape or relative position within a space of the respective characters.

Aspect 9 can optionally include, or optionally be combined with one or more features of any previous Aspect to include, that the article of manufacture is a security document blank having the substrate and the sequence of characters.

Aspect 10 can optionally include, or optionally be combined with one or more features of any previous Aspect to include, that the sequence of characters is microtext.

Aspect 11 of the present disclosure can include a security document that can include a substrate. A sequence of characters can be arranged on the substrate, wherein each character can be selected from one of: a first font set comprising an alphabet of characters and one or more second font sets each comprising an alphabet of characters. For each of the one or more second font sets, at least one character in its alphabet of characters can include a variation as compared to a corresponding character in the alphabet of characters of the first font set. Selection of a given character from either the first font set or one of the one or more second font sets for inclusion in the sequence of characters on the substrate can be at least one of: random, semi-random, or based on a predetermined algorithm. One or more features of Aspect 11 can optionally be combined with one or more features of any previous Aspect.

Aspect 12 can optionally include, or optionally be combined with one or more features of any previous Aspect to include, that the sequence of characters can be arranged into a plurality of words, and at least a first word of the plurality of words and a second word of the plurality of words are the same word. A combination of characters with variations in the first word can be different than a combination of characters with variations in the second word.

Aspect 13 can optionally include, or optionally be combined with one or more features of any previous Aspect to include, that the first font set and a given second font set comprise the same alphabet of characters. Each character in the given second font set can include a variation as compared to a corresponding character in the first font set.

Aspect 14 can optionally include, or optionally be combined with one or more features of any previous Aspect to include, that a plurality of second font sets each comprise the same alphabet of characters as the first font set. Each character in each of the second font sets can include a variation as compared to a corresponding character in the first font set.

Aspect 15 can optionally include, or optionally be combined with one or more features of any previous Aspect to include, that for any given character in the same alphabet of characters, the variation in such given character across the plurality of second font sets can be generally the same in shape but a relative position of such variation within a space of the character can be different in each of the plurality of second font sets.

Aspect 16 can optionally include, or optionally be combined with one or more features of any previous Aspect to include, that for any given character in the same alphabet of characters, the variation in such given character across the plurality of second font sets can be different in shape.

Aspect 17 of the present disclosure can include a method of printing or otherwise forming characters onto a substrate in a manner to inhibit tampering or forgery. The method can include generating a template of text to be formed onto the substrate by defining a sequence of characters arranged in one or more words. A first same character can be used at least twice in the sequence of characters. At least one instance of the first same character can include a variation as compared to at least one other instance of the first same character. At least one instance of the first same character can be selected at least one of: randomly, semi-randomly, or based on a predetermined algorithm. The method can further include printing or otherwise forming onto the substrate the sequence of characters defined by the template. One or more features of Aspect 17 can optionally be combined with one or more features of any previous Aspect.

Aspect 18 can optionally include, or optionally be combined with one or more features of any previous Aspect to include, that generating a template of text can comprise, for at least a subset of the characters in the sequence of characters arranged on the substrate, selecting each character from one of: a first font set comprising an alphabet of characters and one or more second font sets each comprising an alphabet of characters. For each of the one or more second font sets, at least one character in its alphabet of characters can include a variation as compared to a corresponding character in the alphabet of characters of the first font set.

Aspect 19 can optionally include, or optionally be combined with one or more features of any previous Aspect to include, that generating a template of text can comprise defining a sequence of characters arranged into a plurality of words, with at least a first word of the plurality of words and a second word of the plurality of words being the same word. Generating a template of text can further comprise varying a combination of variations of characters in the first word from a combination of variations of characters in the second word.

Aspect 20 can optionally include, or optionally be combined with one or more features of any previous Aspect to include, that printing or otherwise forming onto the substrate the sequence of characters defined by the template can comprise printing or otherwise forming onto the substrate the sequence of characters as microtext.

The above description includes references to the accompanying drawings, which form a part of the detailed description. The drawings show, by way of illustration, specific embodiments in which the invention can be practiced. These embodiments are also referred to herein as "aspects" or "examples." Such aspects or examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The claimed invention is:

1. A method of providing an article of manufacture in a manner to inhibit tampering or forgery, the method comprising:
   providing a substrate;
   determining a sequence of characters in one or more words for arranging on the substrate such that a first same character is used at least twice in the sequence of characters;
   randomly or semi-randomly selecting at least one instance of the first same character to include a variation as compared to at least one other instance of the first same character; and
   printing or otherwise forming the sequence of characters arranged in one or more words on the substrate.

2. The method of claim 1, wherein a plurality of characters are used at least twice in the sequence of characters and wherein at least one instance of each of the plurality of characters that are used twice includes a variation as compared to at least one other instance of that same character.

3. The method of claim 2, wherein:
   determining the sequence of characters comprises arranging the sequence of characters into a plurality of words, and at least a first word of the plurality of words and a second word of the plurality of words are the same word; and
   a combination of variations of characters in the first word is different than a combination of variations of characters in the second word.

4. The method of claim 2, wherein the variation comprises at least one of:
   a dot, a slit, a notch, a triangle, a square, a rectangle, a polygon, or an irregular shape, which at least partially overlaps a space of the corresponding character.

5. The method of claim 2, wherein the variation comprises a subtractive feature formed in the corresponding character.

6. The method of claim 2, wherein the variations of at least two instances of characters that include a variation are different in at least shape or relative position within a space of the respective characters.

7. The method of claim 2, wherein the article of manufacture comprises a security document blank having the substrate and the sequence of characters.

8. The method of claim 7, wherein the sequence of characters is microtext.

9. The method of claim 1, comprising, for at least a subset of the characters in the sequence of characters, selecting each character from one of: a first font set comprising an alphabet of characters and one or more second font sets each comprising an alphabet of characters, wherein for each of the one or more second font sets, at least one character in its alphabet of characters includes a variation as compared to a corresponding character in the alphabet of characters of the first font set.

10. The method of claim 9, wherein selection of a given character from either the first font set or one of the one or more second font sets for inclusion in the subset is at least one of: random or semi-random.

11. A method of printing or otherwise forming characters onto a plurality of substrates in a manner to inhibit tampering or forgery, the method comprising:

generating a template of text to be formed onto the plurality of substrates by defining a sequence of characters arranged in a plurality of words such that a first same character is used at least twice in the sequence of characters;

randomly or semi-randomly selecting at least one instance of the first same character for a first instance of a word in the plurality of words to include a variation as compared to at least one other instance of the first same character in a second instance of the word in the plurality of words to generate a combination of variations of characters in the first instance of the word that are different from a combination of variations of characters in the second instance of the word; and printing or otherwise forming onto each of the plurality of substrates the sequence of characters defined by the template.

12. The method of claim 11, wherein generating a template of text comprises, for at least a subset of the characters in the sequence of characters, selecting each character from one of: a first font set comprising an alphabet of characters and one or more second font sets each comprising an alphabet of characters, wherein for each of the one or more second font sets, at least one character in its alphabet of characters includes a variation as compared to a corresponding character in the alphabet of characters of the first font set.

13. The method of claim 11, wherein printing or otherwise forming onto each of the plurality of substrates the sequence of characters defined by the template comprises printing or otherwise forming onto each of the plurality of substrates the sequence of characters as microtext.

\* \* \* \* \*